July 29, 1958
S. J. MIKINA
2,844,937
JET ENGINE CONTROL
Filed Dec. 16, 1955
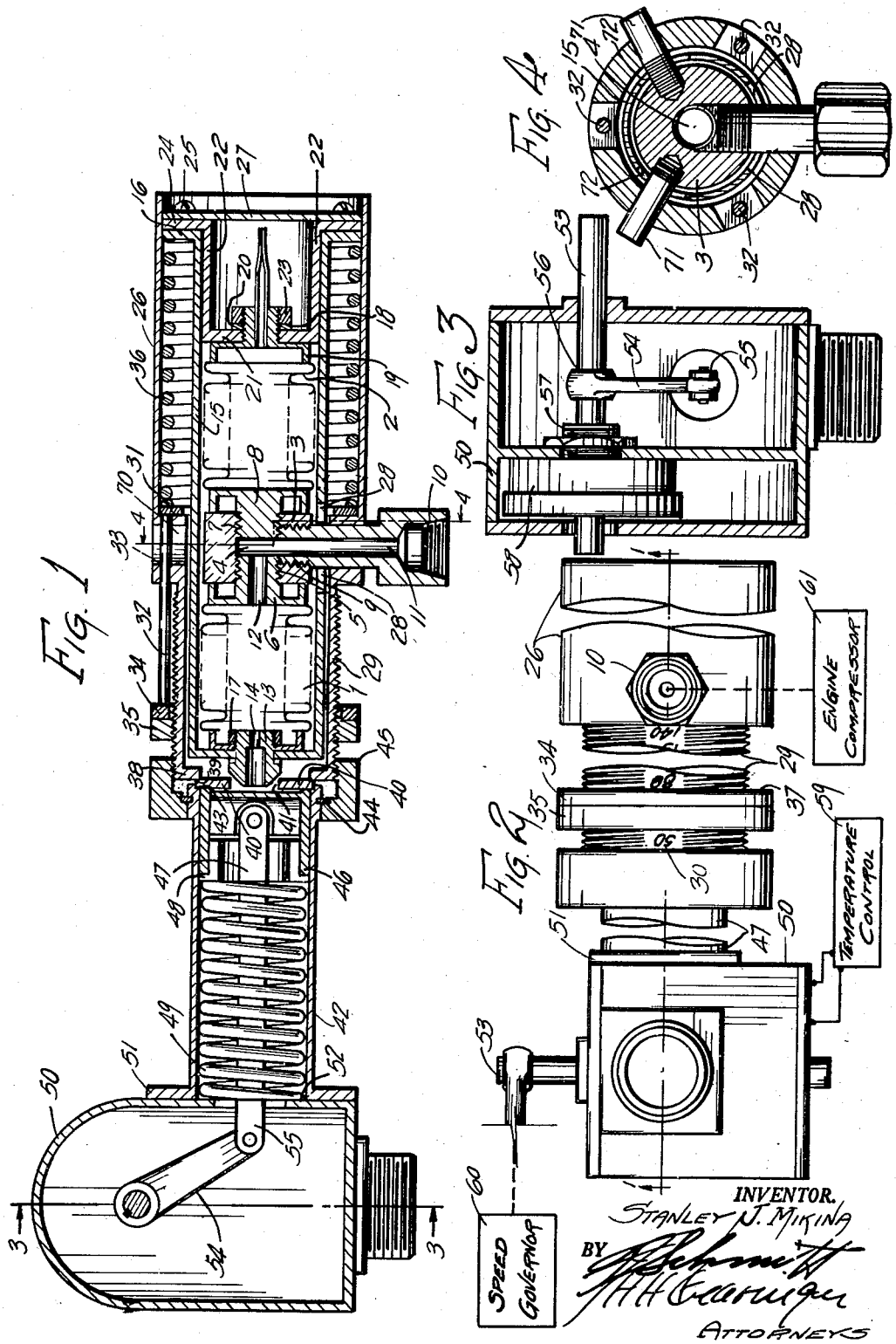
INVENTOR.
STANLEY J. MIKINA
BY
ATTORNEYS

United States Patent Office 2,844,937
Patented July 29, 1958

2,844,937

JET ENGINE CONTROL

Stanley J. Mikina, Pittsburgh, Pa., assignor, by mesne assignments, to the United States of America as represented by the Secretary of the Navy Application December 16, 1955, Serial No. 553,668

1 Claim. (Cl. 60—39.09)

This invention relates to an engine pressure limiting system for an aircraft jet engine.

During certain operating conditions, such as diving pull-outs or high speed level flight, the engine housing between the turbine stator and the compressor stator may be buckled by the excessively high engine torques developed by the combination of the high ram pressure at the intake and full throttle operation of the engine. This structural overloading and failure can be avoided by limiting the maximum pressure which the engine compressor can develop.

Jet engines are controlled by a speed control and a temperature control. The speed control regulates the fuel rate and the temperature control functions to maintain a set temperature in the hot gases entering the turbine by the automatic adjustment of the tail nozzle area. These controls are interconnected so that when the speed control reduces the fuel rate to maintain a set speed, the temperature control will reduce the tail nozzle area to maintain a set temperature. The pressure limiting assembly of the jet engine operates to maintain the pressure at a desired setting. Whenever the pressure in the engine compressor changes from the desired pressure, the pressure limiting assembly functions to adjust the speed control which regulates the fuel rate. Since the speed control and the temperature control are interconnected as explained above, the change in the speed control causes the temperature control to operate and reset the tail nozzle area.

However, in jet engines equipped with an afterburner, a reduction in tail nozzle area connot be permitted when the afterburner is operating. Therefore, in an engine equipped with an afterburner, it is necessary for the pressure limiter to bias the temperature control when the fuel rate is reduced so that there will be no reduction in the tail nozzle area.

This invention limits the pressure developed in the engine compressor to a set pressure by biasing the speed governor to reduce the fuel rate whenever the set pressure is attained. This is accomplished by means of a piston operated by the excessive pressure through the pressure limiting assembly to actuate a rod connected to the speed governor. At the same time, the temperature control is adjusted so that there is no reduction in the tail nozzle area.

It is an object of this invention to prevent excessive pressures in the engine compressor by providing a pressure limiter to bias the speed governor to reduce the fuel rate whenever the pressure in the engine compressor exceeds a set pressure.

It is a further object of this invention to prevent a reduction in the tail nozzle area by biasing the temperature control by the pressure limiter to prevent a reduction in tail nozzle area whenever the engine is equipped with an afterburner and the pressure limiter operates to reduce the fuel rate whenever the pressure in the engine compressor exceeds a set pressure.

Other objects and many of the attendant advantages of this invention will be readily appreciated as the same becomes better understood by reference to the following detailed description when considered in connection with the accompanying drawings wherein:

Figure 1 is a side elevation in cross-section along the line 1—1 of Figure 2.

Figure 2 is a diagrammatical view with the limiter assembly as a bottom plan.

Figure 3 is a cross-sectional view along the line 3—3 of Figure 1.

Figure 4 is a cross-sectional view along the line 4—4 of Figure 1.

Referring to the drawing and in particular to Figure 1, there is disclosed an engine pressure limiter with a welded stainless steel bellows 1 mechanically coupled to an evacuated and sealed barometric bellows 2 by means of the connecting tubular member 3, which is supported in a casing 26 by elements 71. The tubular member 3 has a central aperture 4 with threaded end 5 receiving the threaded portion 6 of the bellows 1 and threaded end 7 receiving the threaded sealed end portion 8 of the bellows 2. A radial bore 9, in communication with the central aperture in the tubular member 3, threadedly receives the fitting 10 having a central bore 11 and being adapted to receive the engine compressor 61 discharge pressure.

In the end portion 6 of the bellows 1 there is an axial bore 12 in communication with the bore 11. In the other end of the bellows 1 a poppet valve 13 with an orifice 14 is threadedly attached to the bellows. The sealed barometric bellows 2 functions to produce a force proportional to the ambient atmospheric pressure in the opposite direction to the atmospheric pressure acting on the bellows 1, since a vent 70 provides access to the atmosphere through casing 26 to the bellows, so that the bellows 1 acts independent of the ambient atmospheric pressure and responds only to the absolute value of the engine compressor pressure.

The bellows 1 and 2 are attached to and within a cylindrical housing 15 which has an annular flange portion 16. A flange 17 on the poppet valve 13 cooperates with a threaded connection with the bellows 1 to secure the bellows to the housing 15. The bellows 2 has a threaded extension 18 from the end wall 19 which fits through an opening 20 in an internal flange 21 of a cylindrical member 22. A lock nut 23 secures the bellows 2 to the flange. The cylindrical member 22 also has an external flange 24 which is secured to the housing 15 by screws 25. The housing 15 is mounted for relative sliding motion in the casing 26 which has a cover 27 on one end to limit the sliding motion in one direction. Slots 28 and 72 in the housing allow for relative sliding motion between the fitting 10, support elements 71 and the housing 15. The other end 29 of the casing is threaded and carries scale graduations 30 in terms of p. s. i. a.

A ring member 31 is mounted for relative sliding motion in the casing 26. Three rods 32 adapted for sliding motion through the openings 33 in the casing are connected between the ring member 31 and a collar 34. A relatively rotatable portion 35 of the collar 34 has threaded engagement with the threaded portion 29 of the casing. A compression spring 36 is located within the casing 26 and is engaged between the ring member 31 and the flange portion 16 of the housing 15. Rotation of the collar 35 actuates the spring 36 to vary the pressure on the bellows 1. Therefore, whenever a pressure is to be set on the bellows 1, the collar portion 35 is rotated and the edge portion 37 serves as an index to read the desired pressure on the scale 30.

The threaded portion 29 terminates in a flange 38 having a circular recess 39. Seated in this recess is the cylinder head 40 with an axial opening 41. The cylinder casing 42 terminates in a flange having a circular recess 43 to engage the cylinder head. A ring 44 is mounted in a peripheral recess in the cylinder casing. A lock nut 45 rotatably mounted on the cylinder casing engages the ring 44 and secures the cylinder casing to the end portion 29 by a threaded connection.

Mounted for sliding motion in the cylinder casing 42 is the piston 46 which is joined to the piston rod 47 by means of an intermediate piece 48 fitting within piston 46 and held against it by biasing spring 49.

A flange 51 on the casing 42 is used to mount the casing 42 on the potentiometer housing. The spring 49 is held in position by bearing against the potentiometer housing at 52.

A shaft 53 is journaled for rotation in the potentiometer housing 50. A crank arm 54 is connected at one end 55 to the piston rod and at the other end 56 to the shaft 53. The shaft 53 is coupled to the potentiometer control 57 so that movement of the piston is converted to rotary displacement of the potentiometer 58 and the shaft 53 by means of the piston rod and crank arm. The potentiometer sends a signal to the temperature control 59 so that the electrical signal will shift the temperature set point downward to prevent tail nozzle area reduction.

The shaft 53 is operatively associated with the speed governor 60 so that rotation of the shaft 53 actuates the governor. Therefore, it is necessary that ordinary operation of the speed governor will not rotate the shaft 53. This is accomplished by giving an initial force to the spring 36 by turning the member 35 so as to compress the spring a predetermined amount so that this force will have to be overcome before the shaft 53 can rotate.

The operation of the engine pressure limiter assembly is as follows: It has been found that the desired pressure to be applied to the interior of bellows 1 lies between 50 to 135 p. s. i. a. This setting is accomplished by adjusting collar 35 and index 37 to the appropriate position on the scale 30. The spring 36 is compressed and through the housing 15 this pressure is placed on bellows 1. Pressure from the engine compressor enters inside bellows 1 through fitting 10. When the compressor pressure exceeds the set pressure, bellows 1 expands, the equilibrium of poppet valve 13 is upset and it begins to close the opening 41. Closure of the poppet valve causes a build up of pressure on the piston 46 since the poppet valve controls the flow out of the cylinder head through the opening 41. The air flow into the cylinder is impeded by the orifice 14. The control valve 13 in series with the orifice 14 modulates the cylinder pressure so that the pressure change in the cylinder is a multiple of the pressure change in the bellows. In the design illustrated, this ratio has been made equal to five.

Thus, when the engine compressor pressure exceeds the set pressure, the piston is actuated by the pressure passing through the poppet valve. As the piston moves this motion is changed by the crank arm to rotary motion of the shaft 53 which reduces the fuel feed by the engine governor. At the same time, potentiometer control 57 is rotated so that the electric signal will shift the temperature set point downward to prevent tail nozzle area reduction.

Because of the relationship of the poppet valve and orifice to the bellows, the device is extremely sensitive to the pressure in the bellows and a small change in engine compressor pressure will readily actuate the piston. It has also been ascertained that there is no appreciable time delay in the actuating cylinder pressure caused by the compliance of the air in the cylinder volume.

Obviously many modifications and variations of the present invention are possible in the light of the above teachings. It is therefore to be understood that within the scope of the appended claim the invention may be practiced otherwise than as specifically described.

What is claimed is:

A device for operating a fuel supply means and a potentiometer for a temperature control in a jet engine in response to the force of pressure from the engine compressor in excess of a predetermined compressor pressure, comprising a casing having a cover on one end, a cylinder with a piston secured to the other end of said casing having an aperture opening into said casing, a rotatable shaft operatively connected to said piston and controlling said fuel supply and potentiometer in response to motion of said piston, a housing mounted in concentric spaced relation within said casing defining a space therebetween, said housing having an outwardly turned flange on its end adjacent the casing cover, said housing being movable toward and away from said cylinder aperture, resilient means mounted in said space between said casing and housing having one end acting on said housing flange, means on said casing extending into said space engaging the other end of said resilient means for exerting a force on said resilient means urging said housing away from said cylinder aperture and toward said casing cover, a poppet valve secured to the other end of said housing for engaging said cylinder aperture and transmitting fluid pressure to said cylinder when said housing is moved toward said cylinder, a bellows in said housing secured at one end to said valve and having its interior communicating with the passage in said poppet valve, a conduit for transmitting fluid pressure from said engine compressor fixed to said casing and extending into said housing, said bellows having its other end fixed to said conduit, the passage in said conduit communicating with the interior of said bellows, so that fluid from said compressor may be transmitted through said bellows and valve to said piston when the force of said fluid is sufficient to move said housing in fluid transmitting engagement with said cylinder, said casing having an opening permitting passage of fluid from said valve when its pressure is insufficient to move said housing in engagement with said cylinder.

References Cited in the file of this patent
UNITED STATES PATENTS

| | | |
|---|---|---|
| 2,638,742 | Carey | May 19, 1953 |
| 2,694,290 | Best | Nov. 16, 1954 |
| 2,720,752 | Chandler et al. | Oct. 18, 1955 |